UNITED STATES PATENT OFFICE.

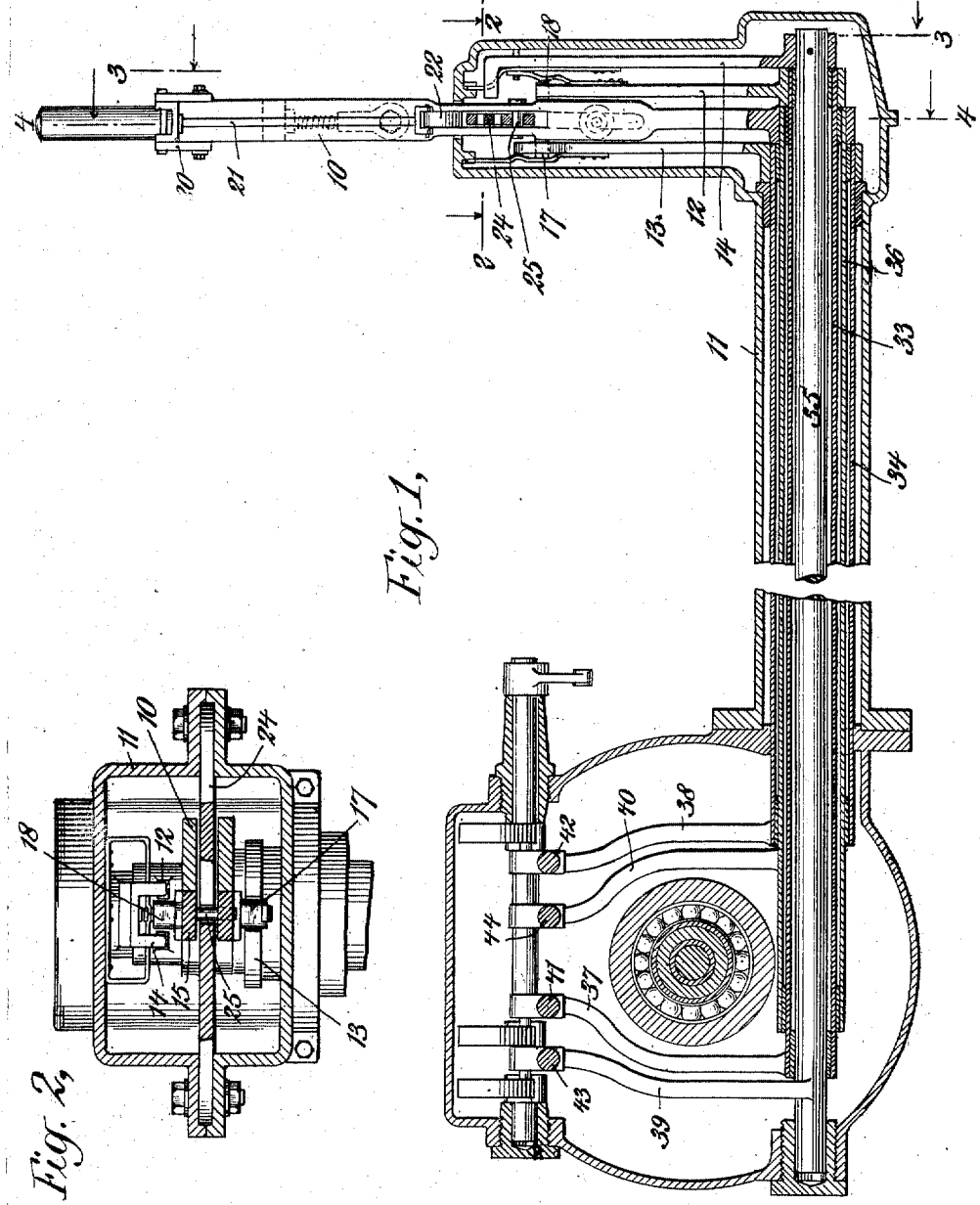

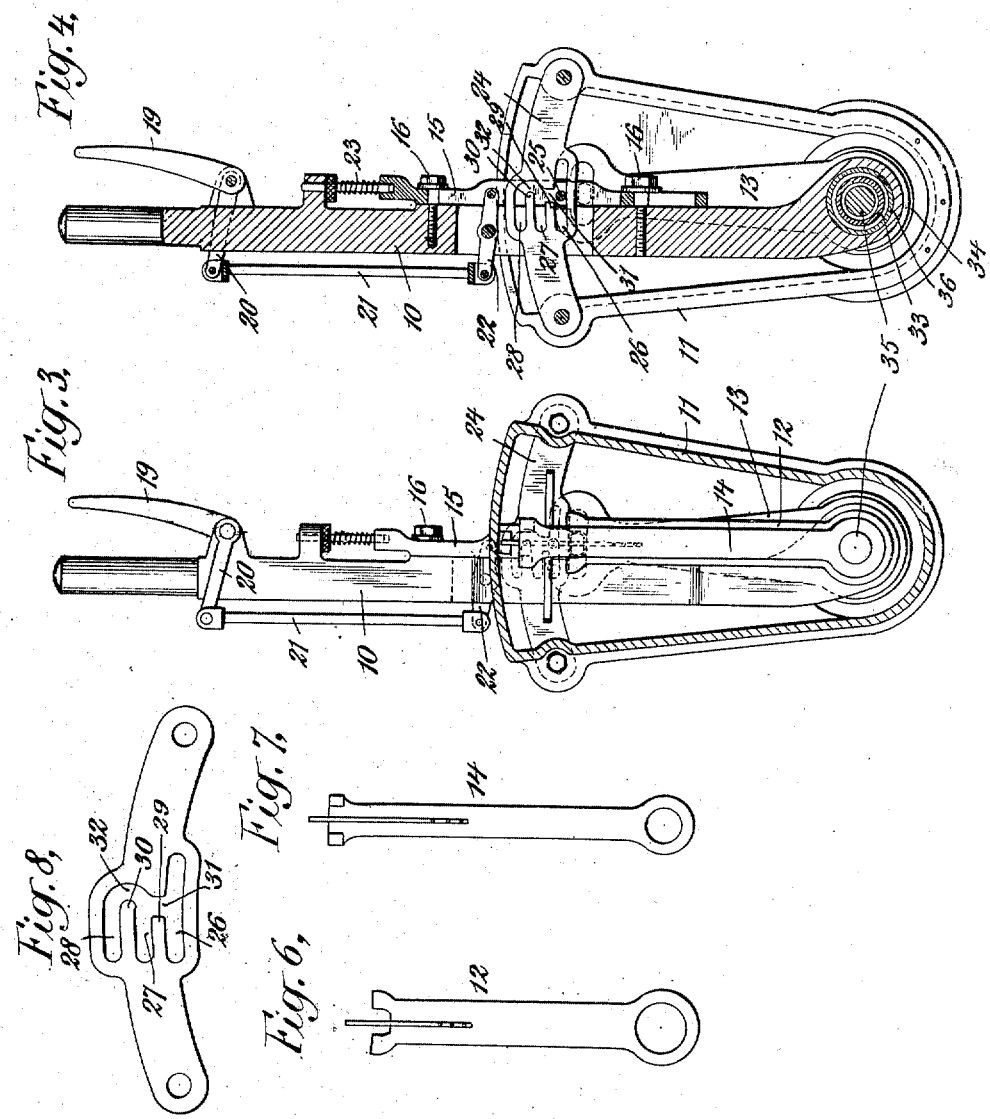

CLARK W. PARKER, OF SPRINGFIELD, MASSACHUSETTS, ASSIGNOR TO PARKER TRANSMISSION AND APPLIANCE COMPANY, OF SPRINGFIELD, MASSACHUSETTS, A CORPORATION OF MASSACHUSETTS.

CONTROLLING-LEVER MECHANISM.

982,857.  Specification of Letters Patent.  Patented Jan. 31, 1911.

Application filed August 4, 1910. Serial No. 575,548.

*To all whom it may concern:*

Be it known that I, CLARK W. PARKER, a citizen of the United States of America, and a resident of Springfield, county of Hampden, and State of Massachusetts, have invented certain new and useful Improvements in Controlling-Lever Mechanism, of which the following is a specification, reference being had to the accompanying drawing, forming a part thereof.

My invention relates to controlling lever mechanism of the type employed for controlling and operating transmission gearing and the like, and consists in improved means whereby a controlling and operating lever may be connected at will with any one of various operating elements, and prevented from being connected with other than the desired operating element when being so operated.

In carrying out my invention I employ one or more movable abutments mounted upon, and carried by, the main operating and controlling lever, the same being conveniently operated by means of a hand latch, the said abutments being adapted to connect with various operating arms in accordance with the position of the said abutments upon the said main operating or controlling lever, and I provide a guiding and limiting means for determining the position of the said abutments, the same comprising a stationary quadrant having a peculiar form of opening therein and provided with shoulders and abutments for engaging a portion movable with the said abutments, all as will be readily comprehended by reference to the accompanying drawings and to the following detailed description, and in order that my invention may be thoroughly understood, I will now proceed to describe an embodiment thereof, having reference to the accompanying drawings illustrating the same, and will then point out the novel features in claims.

In the drawings:—Figure 1 is a view in central transverse section through controlling means constructed in accordance with my invention. Fig. 2 is a transverse sectional view of certain of the parts, the plane of section being taken upon the line 2—2 of Fig. 1. Fig. 3 is a view in vertical section upon the line 3—3 of Fig. 1, the controlling lever and operating arms being shown in side elevation. Fig. 4 is a view in vertical section upon the plane of the line 4—4 of Fig. 1. Figs. 5, 6, and 7 are detail views in side elevation of the operating arms. Fig. 8 is a detail view in side elevation of the guiding and locking quadrant.

The main controlling lever 10 is pivotally mounted at its lower end in a frame or casing 11 in such a way that forward or rearward movements may be imparted thereto, and pivoted co-incidentally therewith are three operating arms 12—13—14 shown separately and in detail in Figs. 5, 6, and 7. The upper ends of the several levers 12—13—14 are provided with projections arranged for co-engagement with a movable element carried by the said lever 10. This movable element comprises a slide 15 secured to the controlling lever 10 by means of bolts 16—16, the bolts passing through an elongated slot in the said slide 15 whereby a limited longitudinal movement of the said lever with respect to the controlling lever 10 is permitted, and abutments 17—18 extending laterally of the said lever upon opposite sides of the said slide. These abutments are arranged for co-engagement with the upper bifurcated ends of the operating arms 12—13—14, the abutment 18 being arranged in the lowermost position of the slide for engagement with the operating arm 12, and in the uppermost position of the slide with the operating arm 14, while the abutment 17 is arranged in an intermediate position of the slide for engagement with the operating arm 13. When either of the abutments is so engaged the other arms are released from such engagement, the bifurcated portions of the arms 12—13—14 being arranged at different levels for this purpose, as will be well understood by reference to the drawings. The slide 15 is arranged to be moved by means of a hand latch 19 pivotally connected to the controlling lever near its upper end, the said latch being provided with an arm 20 which is connected by means of a link 21 with a rocking lever 22, the latter being pivotally connected intermediate its ends to the said controlling lever and pivotally connected at the end opposite to that at which it is connected with the link to the said slide. When the latch 19 is depressed the slide 15 will be lifted while when it is released a spring 23 will operate to return it to its lowermost position.

Secured to the stationary casing 11 is a quadrant 24 having a guiding opening therein which tends to guide, limit, and determine the movement of the slide in the following manner. This quadrant passes through a slotted portion of the slide 15 and a pin 25 with which the said slide is provided and which passes across the said slotted portion is received within a guiding opening in the said quadrant 24. This guiding opening comprises three slots 26—27—28 arranged parallel with each other and concentric with the pivotal axis of the lever, the three said slots having progressively increasing radii. The said slots are separated by tongues 29—30, and cross-over passages 31—32 serve as means by which the pin 25 may be caused to pass from one of the said slots to the other. The cross-over passage 32 is arranged out of direct line with the cross-over passage 31, or, in other words, the tongue 30 is longer than the tongue 29 and extends across a path directly in line with the said cross-over passage 31. In the normal rest position of the parts the pin 25 lies upon the bottom of the lowermost slot 26. In this position the lever may be moved freely backward and forward without manipulation of the hand latch 19 in any manner, and in this position it will be remembered that the controlling lever is connected through the medium of the slide 15 and the abutment 18 with the operating arm 12. When it is desired to disconnect the controlling lever from engagement with the operating arm 12 and to connect it with the operating arm 13 it will be necessary to first bring the controlling lever to a central position and then to depress the latch 19. This will lift the slide 15 so as to disengage the abutment 18 from the operating arm 12 and to cause the abutment 17 to engage with the operating arm 13. The inner end of the tongue 30 will act at this time as a limiting stop to prevent the pin from passing into the slot 28 so as to insure the proper engagement of the abutment 17 with the operating arm 13 and to prevent an accidental excess movement such as would cause the abutment 18 to engage the arm 14. The controlling lever may now be given a backward movement and will thereby transmit a corresponding movement to the arm 13 and a corresponding operation of the parts controlled and operated thereby. In order to cause the locking pin 25 to enter the slot 28 it will be necessary after it has been lifted to a point where it is stopped by the tongue 30, to move the controlling lever slightly forward, thereby freeing the pin 25 from engagement with the tongue 30 and permitting it to enter the cross-over slot 32, and thereafter upon a further depression of the latch 19 the pin will be caused to pass around the end of the tongue 30 through the cross-over passage 32, and thus into the slot 28. When in the slot 28 the lever 10 may be moved backward to thereby impart an operating movement to the operating arm 14.

From the foregoing it will be seen that the various slots 26—27—28 controlling the position of the slide 15 and hence of the portion or portions thereof will operatively engage the various operating arms so that during an operating movement of the controlling lever it will be impossible for the slide 15 to move with relation to the lever 10 even though the latch 19 be released. In the neutral central position of the lever the tongue 30 will act to prevent the accidental overthrow movement of the slide and will limit the movement of the slide to the proper degree as is desired, while a complete upward movement of the slide is readily effected by a simple movement of the lever simultaneously with the exertion of a slight force upon the hand latch 19.

The several operating arms 12—13—14 may be connected with any suitable means such as the clutch mechanism of transmission gearing, and in the drawings I have shown them as secured to a plurality of concentric shafts 33—34 and 35, the shafts 33 and 34 being hollow and surrounding the shaft 35, and I have shown the main controlling lever 10 as connected to a hollow shaft 36 also disposed concentrically with the other said shafts and located between the shafts 33 and 34. The several shafts 33—34—35—36 are provided at their inner ends with arms 37—38—39—40, the upper ends of which engage clutch operating shipper rods 41—42—43—44. It is unnecessary in the present application to go into the details of this clutch mechanism as the same forms no part of the present invention, but for the complete drawings and description of a device with which this controlling mechanism is adapted to be employed I refer to a copending application Serial Number 545,563 filed February 24, 1910.

What I claim is:

1. In mechanism of the class described, the combination with a pivotally mounted controlling lever and a plurality of operating arms, of a movable element upon the controlling lever having means for co-engagement with the said operating arms respectively in accordance with its position upon the said controlling lever, and a stationary guiding element for co-engagement with the said movable element, the said guiding element having a plurality of slots concentric with the pivotal axis of the said controlling lever and of progressively increasing radii, the said slots having cross-over connections between them disposed out of line with each other.

2. In mechanism of the class described, the combination with a pivotally mounted controlling lever and a plurality of operating arms, of a movable element upon the controlling lever having means for co-engagement with the said operating arms respectively in accordance with its position upon the said controlling lever, and a stationary guiding element for co-engagement with the said movable element, the said guiding element having a plurality of slots separated by tongues one of which extends beyond the tongue beneath it and having cross-over passages connecting the said slots around the ends of the said tongues, the said movable element having a portion arranged to be received within the said slots whereby it will be guided and limited in its movement thereby.

3. In mechanism of the class described, the combination with a pivotally mounted controlling lever and a plurality of operating arms, of a movable element upon the controlling lever having means for co-engagement with the said operating arms respectively in accordance with its position upon the said controlling lever, and a stationary guiding element for co-engagement with the said movable element, the said guiding element having three concentric slots of progressively increasing radii and provided with a cross-over passage connecting the lower slot with the middle one and another cross-over passage connecting the middle slot with the upper one, the two said cross-over passages being out of direct line with each other, substantially as and for the purpose set forth.

4. In mechanism of the class described, the combination with a pivotally mounted controlling lever and a plurality of operating arms pivotally mounted concentrically therewith, of a movable element upon the controlling lever having means for co-engagement with the said operating arms respectively in accordance with its position upon the said controlling lever, a hand latch carried by the said controlling lever for moving the said movable element, and a stationary guiding element for coaction with the said movable element, the said guiding element having a plurality of slots upon different levels for engaging a portion of the said movable element and having an abutment for limiting the movement of the said movable element upon the controlling lever when the controlling lever is in its normal rest position, the said abutment being arranged to release the said movable element and permit a further movement thereof with respect to the said controlling lever after a slight rocking movement has been imparted to the said controlling lever about its pivotal axis.

CLARK W. PARKER.

Witnesses:
J. C. HARTMANN,
LYMAN S. ANDREWS, Jr.